United States Patent
Zuo et al.

(10) Patent No.: US 7,145,749 B2
(45) Date of Patent: Dec. 5, 2006

(54) ACTUATOR ASSEMBLY INCLUDING AN ACTUATOR BODY DAMPING ASSEMBLY

(75) Inventors: Xu Zuo, Prior Lake, MN (US); Xiaohong Sun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 107 days.

(21) Appl. No.: 10/713,825

(22) Filed: Nov. 14, 2003

(65) Prior Publication Data

US 2005/0105404 A1    May 19, 2005

(51) Int. Cl.
*G11B 7/00* (2006.01)

(52) U.S. Cl. .................................. 360/97.02

(58) Field of Classification Search ............ None
See application file for complete search history.

(56) References Cited

U.S. PATENT DOCUMENTS

| | | |
|---|---|---|
| 4,602,175 A | 7/1986 | Castagna |
| 5,148,071 A | 9/1992 | Takahashi |
| 5,471,734 A | 12/1995 | Hatch et al. |
| 5,491,598 A * | 2/1996 | Stricklin et al. ......... 360/265.6 |
| 5,595,117 A * | 1/1997 | Chrigui ...................... 101/216 |
| 5,650,896 A | 7/1997 | Viskochil |
| 5,657,187 A | 8/1997 | Hatch et al. |
| 5,774,294 A | 6/1998 | Fioravanti |
| 5,801,905 A | 9/1998 | Schirle et al. |
| 5,805,387 A | 9/1998 | Koester |
| 5,907,452 A * | 5/1999 | Kan ........................ 360/97.01 |
| 5,940,251 A | 8/1999 | Giere et al. |
| 5,943,191 A | 8/1999 | Giere et al. |
| 6,922,305 B1 * | 7/2005 | Price ....................... 360/78.12 |
| 6,937,444 B1 * | 8/2005 | Oveyssi .................... 360/265.8 |
| 6,947,260 B1 * | 9/2005 | Dominguez et al. ........ 360/265 |
| 6,967,821 B1 * | 11/2005 | Himes et al. ............. 360/245.3 |

OTHER PUBLICATIONS

"Damped Voice Coil/Bobbin Assembly"; IBM Technical Disclosure Bulletin; Nov. 1973; Fg. 1816; vol. 16; Issue No. 6; IBM Corporation; US.

* cited by examiner

*Primary Examiner*—Allen Cao
(74) *Attorney, Agent, or Firm*—Fellers, Snider, et al.

(57) ABSTRACT

An actuator assembly including a body portion having at least one actuator arm extending therefrom is disclosed. The body portion includes a body damping assembly to control vibration modes of the actuator body. The damping assembly is coupled to the actuator body of a head actuator assembly to control vibration modes of the actuator body to reduce head positioning errors.

24 Claims, 6 Drawing Sheets

ACTUATOR ASSEMBLY INCLUDING AN ACTUATOR BODY DAMPING ASSEMBLY

FIELD OF THE INVENTION

The present invention relates generally to a damper assembly for an actuator assembly, and more particularly but not by limitation to a damping assembly for an actuator body of a head actuator assembly.

BACKGROUND OF THE INVENTION

Data storage devices store digitally encoded information on discs. Heads read data from or encode or record data to discs or other data storage media. Heads are positioned relative to selected data tracks via operation of a head actuator assembly. The head actuator assembly typically includes an actuator block including a body portion having a plurality of actuator arms extending therefrom. Heads are coupled to the plurality of actuator arms to read and/or write information relative to discs. The actuator block or body portion is actuated or moved by a drive assembly or motor to position the actuator arms and heads relative to select data tracks on the disc surface to read or write information relative to discs. Excitation of vibration modes of the actuator assembly or body portion during operation of the drive assembly or motor can interfere with head positioning and in particular, interfere with placement of a servo head to record servo information or patterns on a disc. Embodiments of the present invention provide solutions to these and other problems, and offer other advantages over the prior art.

SUMMARY OF THE INVENTION

The present invention relates to an actuator assembly including a body portion having at least one actuator arm extending therefrom and a body damping assembly to control vibration modes of the actuator body. The damping assembly is coupled to the actuator body of a head actuator assembly to control vibration modes of the actuator body to reduce head positioning errors. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
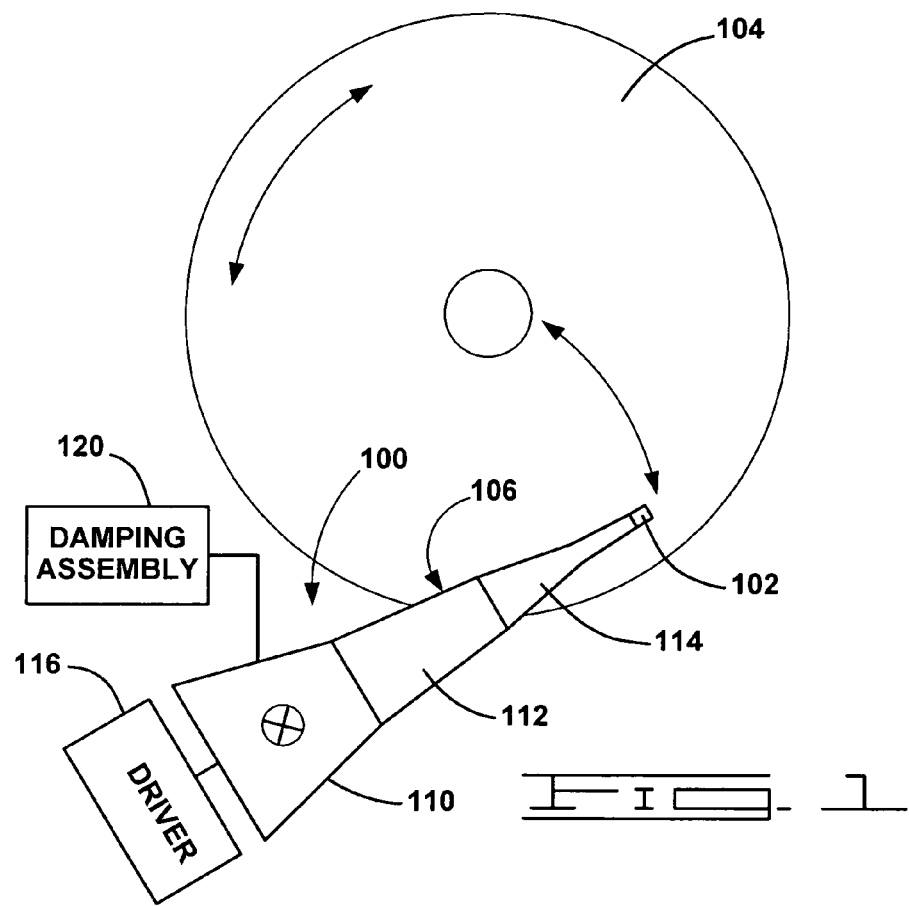
FIG. 1 is a schematic illustration of an embodiment of an actuator assembly including a damping assembly coupled to a body portion of the actuator assembly.

FIG. 1 schematically illustrates a head actuator assembly 100 which is movably supported to position a head (or heads) 102 relative to a disc or data storage medium. In particular as shown, the head actuator assembly 100 includes an actuator block 106 including a body portion 110 having at least one actuator arm 112 extending therefrom to support a head suspension assembly or assemblies 114 (including head 101) relative to the disc or data storage medium 104. A drive assembly or motor 116 is coupled to the actuator block or body portion 110 to move or pivot the actuator assembly to position the head or head suspension assembly 114 relative to the disc 104. Operation of the actuator assembly can excite vibration modes of the actuator block or body portion which can interfere with head placement or positioning relative to the disc surface. The present invention relates to a damping assembly 120 as illustrated schematically which is coupled to the body portion 110 or block to control vibration modes of the actuator assembly or block to reduce head placement errors.

Figure 2:
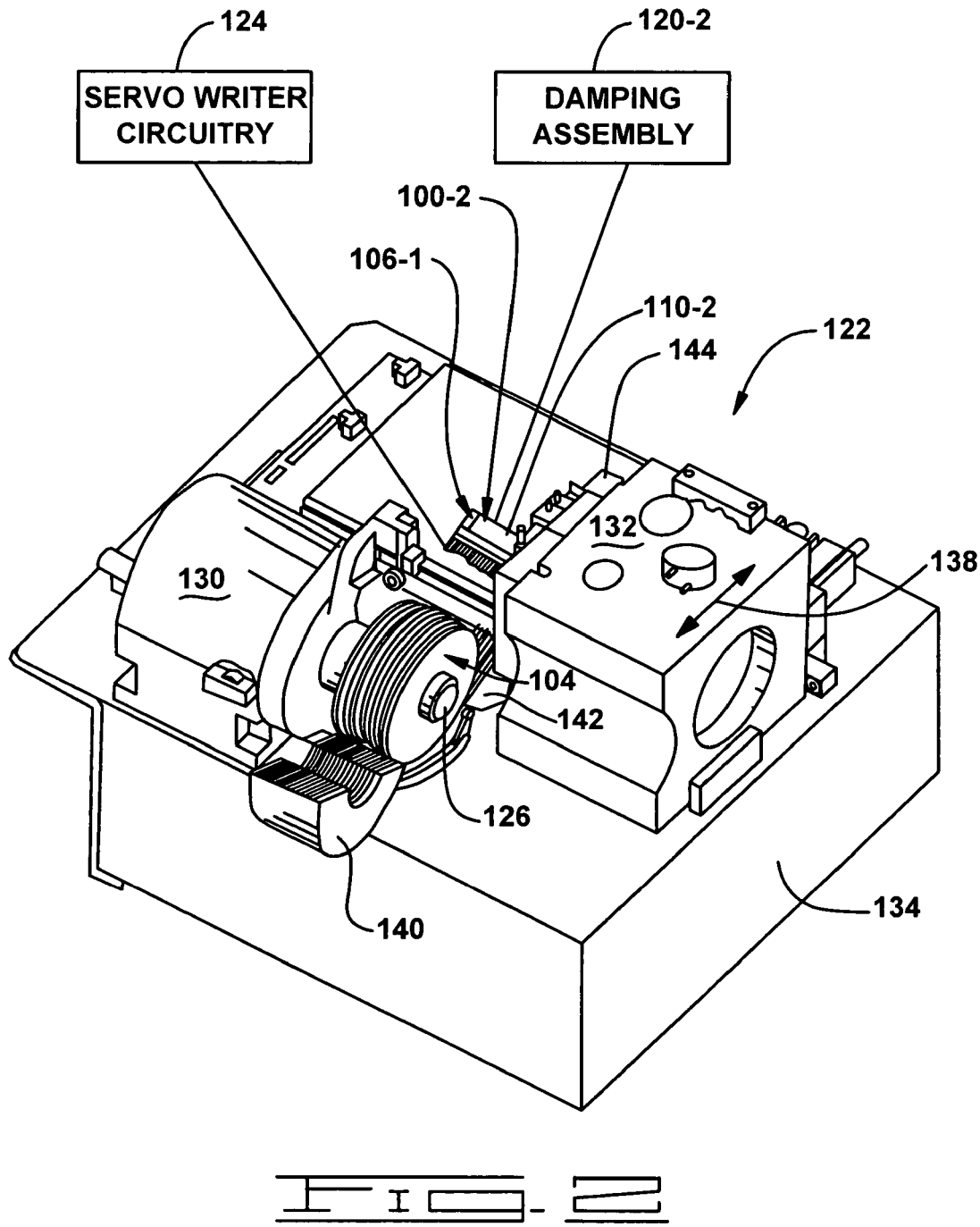
FIG. 2 is an illustration of an embodiment of a servo writing apparatus including an actuator assembly having a damping assembly coupled to a body portion of the actuator assembly.

As previously discussed, heads are positioned relative to discs to read data from or write data (or encode servo information) to discs. Heads are positioned relative to data tracks on the disc via a servo control system including servo information or patterns encoded on a disc or discs. For example, servo patterns or information can be encoded on a disc or discs between data sectors of each track of a disc "embedded servo information" or on a surface of a dedicated disc or "dedicated servo". Servo information or patterns are pre-recorded or written during manufacture of data storage devices for example, via a dedicated servo track writing apparatus 122 as illustrated in FIG. 2. In the illustrated servo track writing apparatus 122, servo track information is recorded on a plurality of discs of a disc stack simultaneously to form a multiple disc servo track writing apparatus.

Embodiments of the damping assembly have application for servo track writing apparatus and in particular for the multiple disc servo track writing apparatus 122 of FIG. 2. As shown the servo track writing apparatus 122 includes a head actuator assembly 100-2, which as shown in FIG. 2, includes an actuator block 106-2 having a body portion 110-2 and a plurality of cantilevered actuator arms extending therefrom. For encoding servo information or patterns a plurality of heads (or head suspension assemblies) are coupled to the cantilevered actuator arms. As shown, the plurality of heads (or head suspension assemblies) are coupled to servo writing circuitry 124 to encode or record servo information to the disc via operation of the actuator assembly 100-2. Discs 104 (or disc stack) are supported on a spindle hub 126 of a spindle block or assembly 130 for rotation by a spindle driver (not shown). The actuator block or assembly is coupled to a servo block 132 to position heads relative to a disc or discs supported on the spindle hub 126 to encode servo patterns or information on the discs or discs.

For operation, discs are loaded onto the spindle hub 126 and are merged with the plurality of actuator arms or heads of the actuator assembly 100-2 to simultaneously recorded servo information to the plurality of discs of the disc stack. In the illustrated embodiment, the spindle hub 126 has a generally horizontal position relative to a platform or base 134 (such as a granite platform or base) to vertically support discs (or a plurality of discs) for vertically orientated servo writing. Discs are removably secured relative to the spindle hub 126 by a clamp. In the particular embodiment illustrated in FIG. 2, spindle hub 126 is stationarily supported relative to the rigid platform or base 134 by spindle block 132 and the actuator block 106-2 or assembly is movably supported relative to the base or platform 134 as illustrated by arrow 138 via servo block 134 to move or position the actuator block 106-1 and heads between a retracted position (shown in FIG. 2) and a merged position (not shown) to record servo information to the discs.

In particular, the actuator assembly or actuator arms are retracted to load and unload discs on the spindle hub 126 and are merged to record servo information. As shown, the spindle assembly 130 includes an air dam 140 and stripper 142 which are movable between an opened position (shown in FIG. 2) to load and unload discs and a closed position to record servo information. Although in the illustrated embodiment, servo block 132 is movably supported relative to spindle block or assembly 130 to merge the heads suspension assemblies (heads) and discs, application is not so limited and the spindle block or assembly 130 or both the spindle block 130 and servo block 132 can be movable between a retracted position and a merged position to merge heads and discs.

Figure 3:
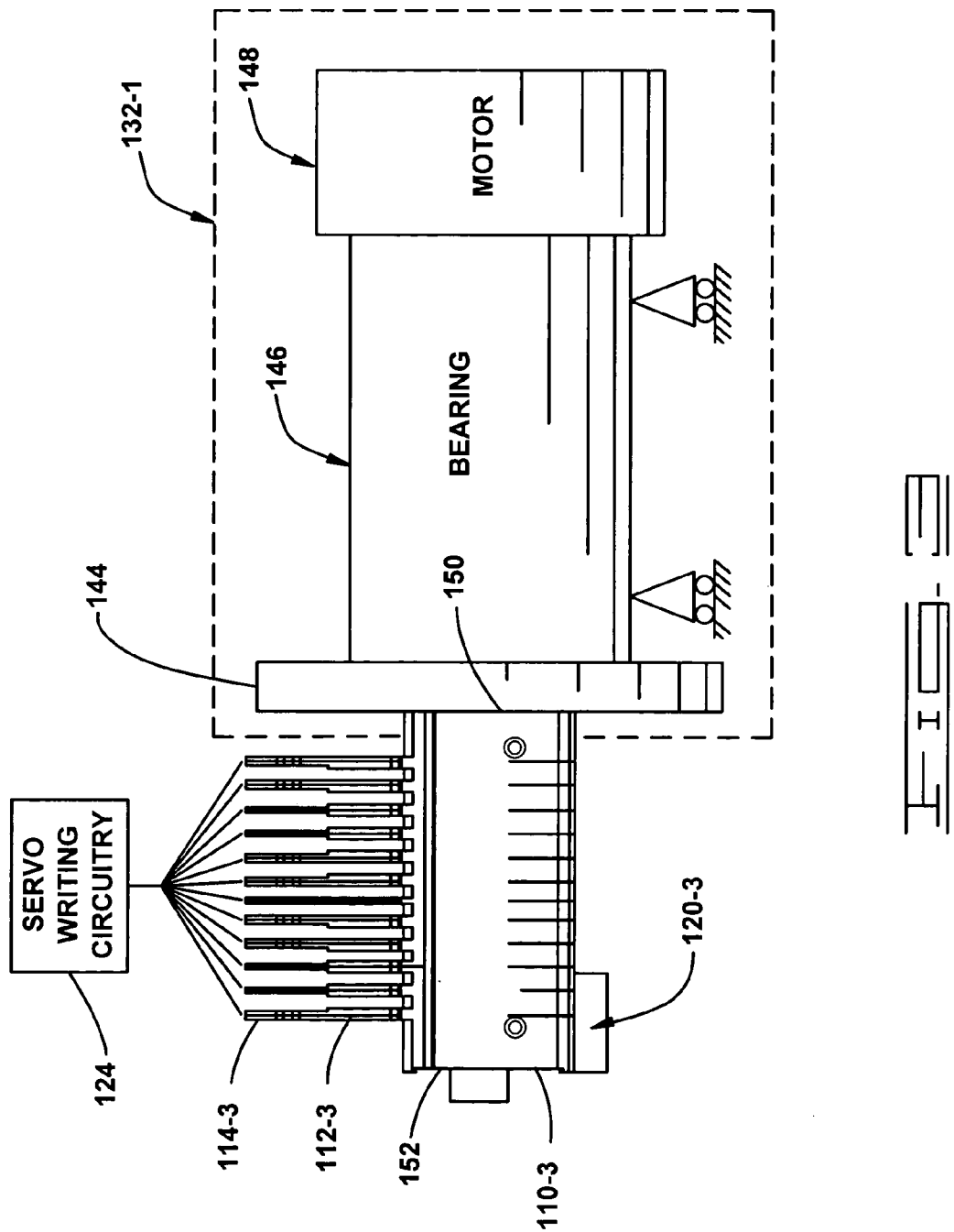
FIG. 3 is a schematic illustration of an actuator assembly for a servo writing apparatus as illustrated in FIG. 2 including a body damping assembly.

As previously discussed operation of the actuator assembly can excite vibration modes of the actuator block or body portion interfering with servo writing operations. In the illustrated embodiment, the actuator assembly includes damping assembly 120-2 which is coupled to the body portion 110-2 to control vibration modes of the actuator body or block to limit head placement errors during operation. FIG. 3 is a detailed illustration of the actuator assembly for a vertically orientated multiple disc servo writing apparatus. As shown, the actuator block is coupled to or supported relative to actuator plate 144 which is interfaced with an air bearing 146 to pivot or move the actuator block 106-2 to position the heads (or head suspension assemblies) relative to the discs supported on the spindle hub 126 as shown in FIG. 2. The actuator block or body portion is pivoted or moved via motor 148 as schematically shown.

In the illustrated embodiment, a proximal end 150 of the actuator body or block 110-3 is coupled to plate 144 and a distal end 152 is cantilevered therefrom to form an elongate cantilevered dimension extending the between the proximal and distal ends 150, 152. The plurality of actuator arms extend from the body portion 110-3 at spaced intervals between the proximal and distal end 150, 152 thereof. Each of the actuator arms includes head suspension assemblies or heads which are coupled to servo writing circuitry 124 as schematically illustrated to encode servo information to the disc as previously described.

During operation vibration of the actuator assembly can interfere with head positioning. The present invention provides a body damping assembly to control excitation of vibration modes of the body portion or block. In particular, in the illustrated embodiment for the servo writing apparatus 122 for encoding servo patterns on vertically orientated discs or disc stack, the horizontal or cantilevered orientation of the actuator body can excite a torsional vibration mode of the actuator body 110-3. In the illustrated embodiment, the damping assembly 120-3 is positioned proximate to the distal end 152 of the body portion 110-3 or actuator block spaced from the proximal end 150 and is designed to optimize the mass distribution or profile to control vibration amplitude or control excitation frequencies of vibration modes of the actuator body.

Figure 4:
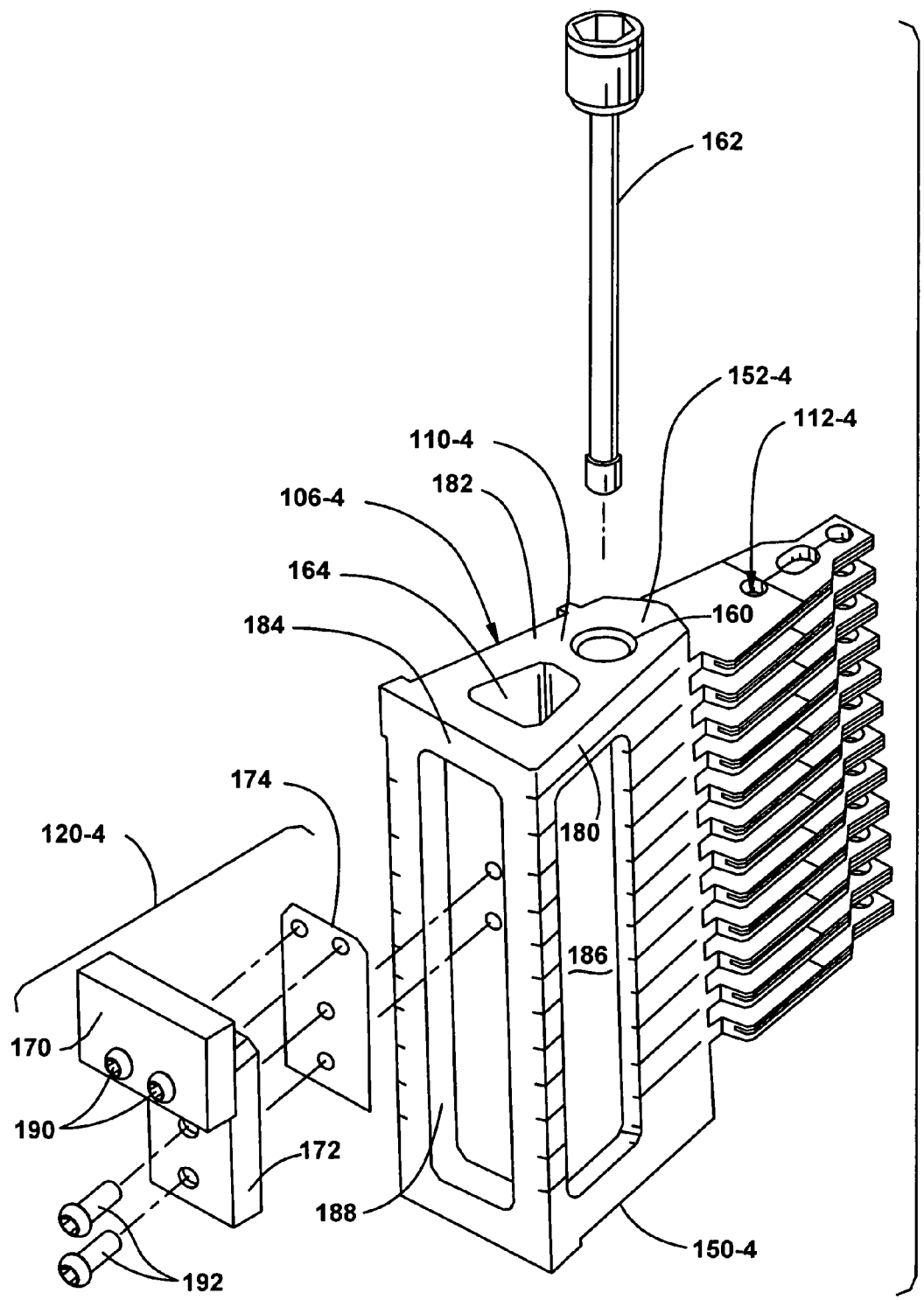
FIGS. 4–6 illustrate an embodiment of a damping assembly coupled to a body portion of an actuator assembly including a plurality of actuator arms.
Figure 5:
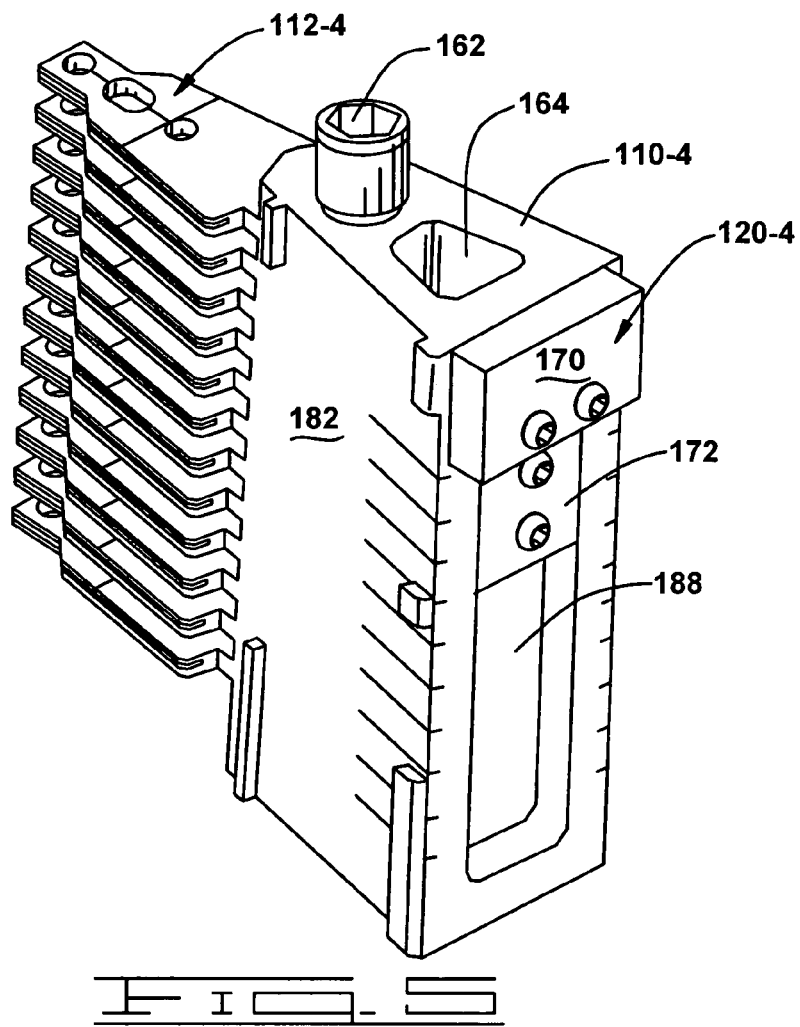
Figure 6:
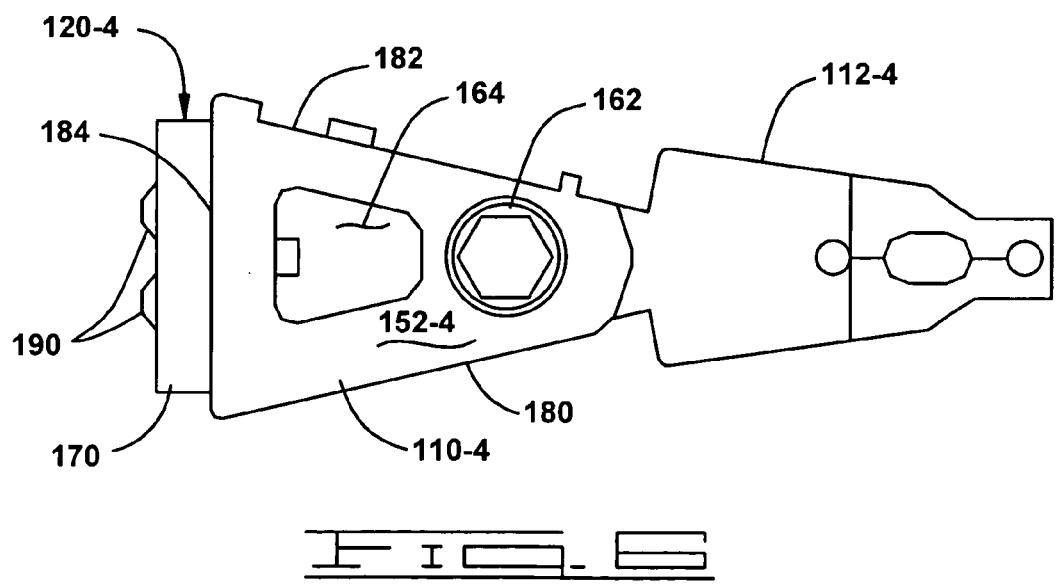

FIGS. 4–6 illustrate an embodiment of a damping assembly 1204 for an actuator assembly, where like numbers are used to refer to like parts in the previous FIGS. As shown, the body portion 110-4 of the actuator block includes a bore 160 adapted to receive rod 162 therethrough to secure the actuator assembly or block 106-4 relative to actuator plate 144 of the servo writing apparatus and an inner void or cavity 164 to reduce the inertial mass of the actuator body. Reductions in the mass can reduce rigidity of the body portion and affect the dynamic response or vibration modes of the actuator block or body 110-4. In the illustrated embodiment, the damping assembly 120-4 includes first and second rigid damping blocks or bodies 170, 172 and a damping layer 174, such as a viscoelastic damping layer. Damping blocks or bodies 170, 172 are formed of a rigid material, such as stainless steel and damping layer 174 is formed of a viscoelastomeric material such as nitrile. The damping assembly 1204 is secured proximate to the distal end 1524 to provide rigidity and optimize mass distribution to control vibration modes as previously described.

In particular in the embodiment for a vertical servo writing apparatus, the damping assembly provides a rigid body or mass proximate to the distal end 152 to provide rigidity and control a torsional vibration mode of the actuator body. The rigid body or mass of the damping assembly 120-4 provides an asymmetrical mass or weight between the proximal and distal ends 150, 152 of the actuator body to provide additional rigidity and distal mass to control excitation of torsional vibration of the actuator assembly or body.

In the embodiment shown, the actuator body includes opposed side faces 180, 182 and a rear or back face 184. As shown, side face 180 and rear face 184 include a window 186, 188 opened to the inner void or cavity 164. Side face 182 includes a relatively planar surface to mount a circuit board or card (or pre-amp card) relative to the actuator block 106-4 to provide an electrical interface to system or servo circuitry 124. In the embodiment shown, the damping assembly 120-4 is secured to the rear face 184 of the actuator body. In the embodiment shown, the block or body 172 and damping layer 174 have a narrow body width sized to seat in the window 188 of the rear face 184 to form an inner portion of the damping assembly and provide rigidity and mass proximate to window 188. Block or body 170 has a wider or transverse body width relative to the first block or body 170 which extends across the width of the rear face 184 in the illustrated embodiment.

Figure 7:
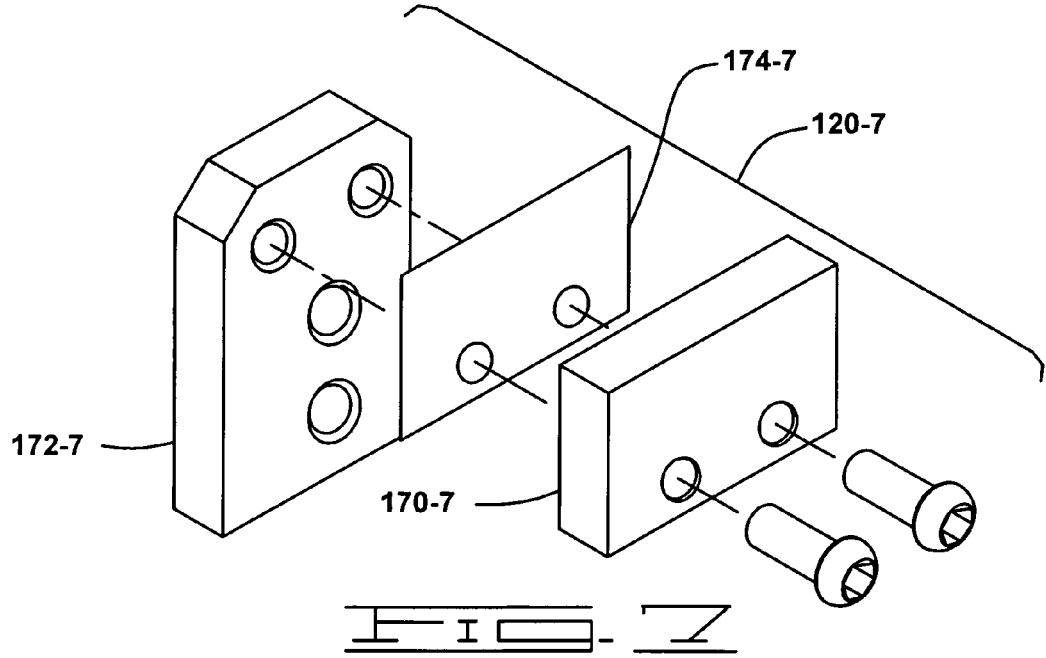
FIG. 7 is an exploded view of another embodiment of a damping assembly for a head actuator assembly.

Damping blocks or bodies 170, 172 and damping layer 174 are removably secured relative to fasteners 190 and block 172 and damping layer 174 are secured relative a support (not shown) of the actuator block or body via fasteners 192. The mass and dimensions of the damping blocks or bodies 170, 172 are designed to optimize vibration modes of the body and application is not limited to the specific embodiments described. In the embodiment illustrated in FIG. 4, the damping layer 174 is interfaced between rigid bodies 170, 172 and the actuator block. In an another embodiment as illustrated in FIG. 7, damping assembly 120-7 includes a damping layer 174-4 interposed between blocks 170-7, 172-7. In the illustrated embodiment shown damping layer includes a transverse width having a similar width dimension as body 170-7.

Figure 8:
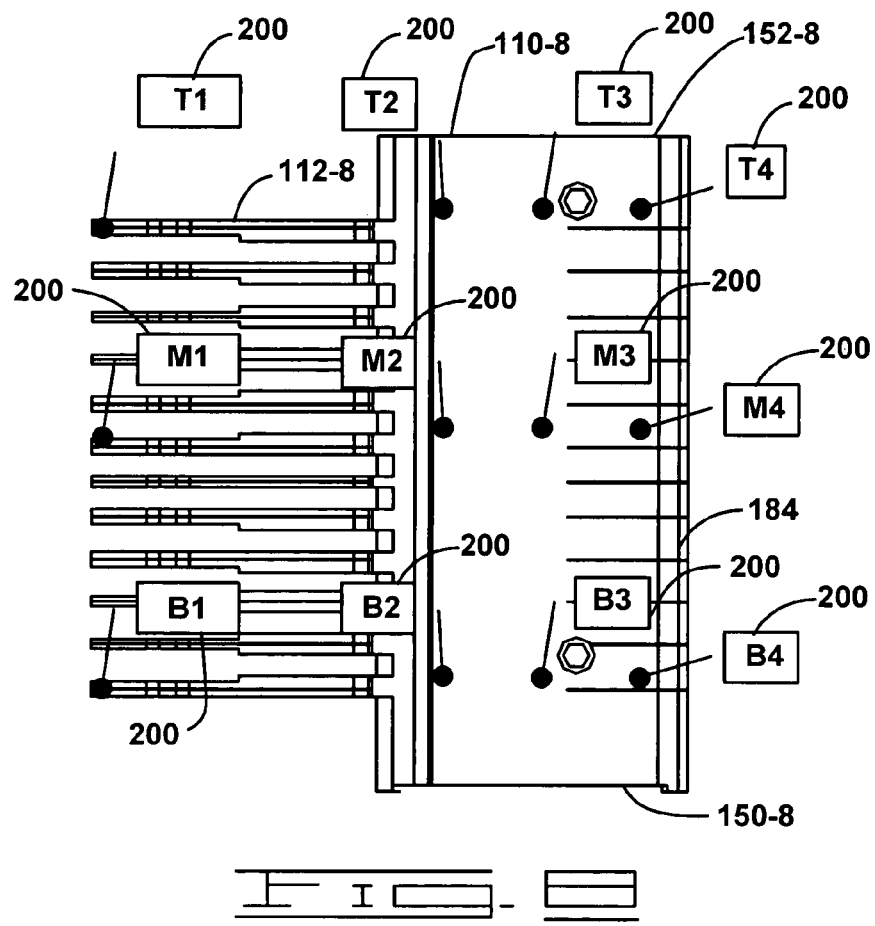
FIG. 8 illustrates an embodiment of an actuator assembly having sensors coupled thereto to generate a plot or profile of vibration modes of the actuator assembly.
Figure 9:
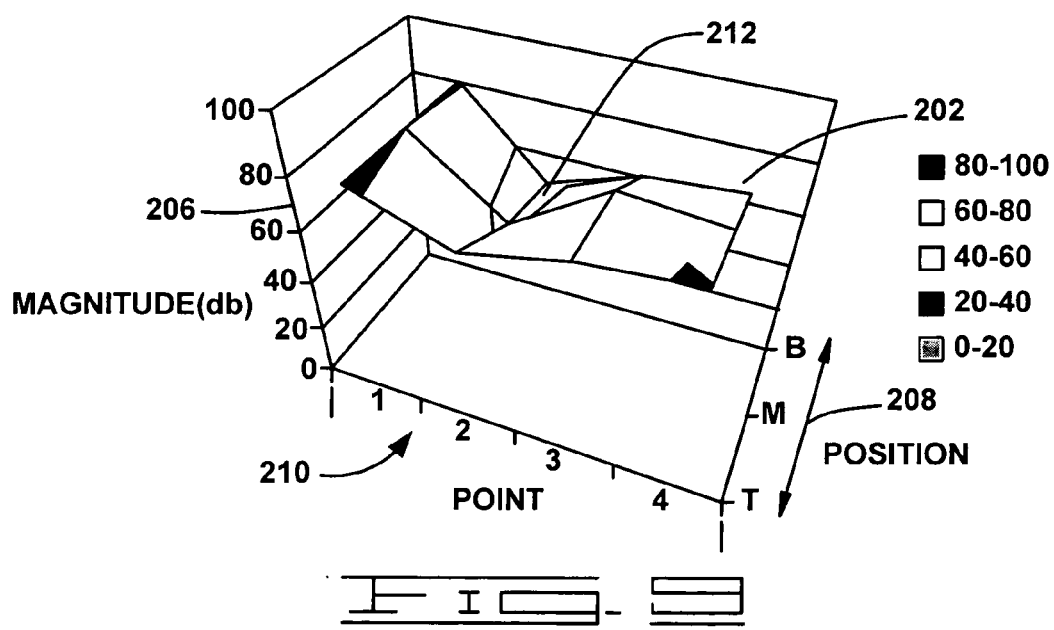
FIG. 9 is a graphical illustration of a vibration profile or mode for an embodiment of a head actuator assembly.

As previously described, the damping assembly provides a mass or weight profile to control vibration modes of the actuator assembly. The configuration of the damping assembly is derived based upon vibration profiles of the actuator body or block using an array of sensors 200. Sensor 200 are linear transducers or LVDT sensors which measure vibration. In the embodiment illustrated in FIG. 8, a plurality of sensors are spaced at B, M, T between the proximal and distal ends 150-8, 152-8 of the actuator body 110-8. Sensors 200 are also spaced at points or intervals 1, 2, 3, 4, between the rear face 184 of the actuator body and a cantilevered end of the actuator arm as shown. FIG. 9 illustrates a vibration profile 202 for the actuator assembly. As shown a vibration amplitude 206 as graphically shown relative to B, M, T (along axis 208) and points or intervals 1, 2, 3, 4 (along axis 210) of the actuator body or block. The damping assembly is designed to provide additional weight or mass to control excitation of the vibration mode (in particular a torsional vibration mode 212 proximate to the distal end 152-4 of the actuator body.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to particular embodiments, it will be appreciated by those skilled in the art that the teachings of the present invention can be applied to other embodiments, without departing from the scope and spirit of the present invention.

What is claimed is:

1. An actuator assembly comprising a body portion, at least one actuator arm extending from the body portion, and a damping assembly configured to suppress a torsional vibration mode of the body portion, said vibration mode determined prior to attachment of the damping assembly to the body portion.

2. The actuator assembly of claim 1 wherein the damping assembly comprises at least one viscoelastic damping layer.

3. The actuator assembly of claim 1 wherein the damping assembly comprises at least one rigid body attached to the body portion.

4. The actuator assembly of claim 1 wherein the damping assembly comprises a first rigid body, a second rigid body and a viscoelastic damping layer.

5. The actuator assembly of claim 4 wherein the viscoelastic damping layer is interposed between the first and second rigid bodies.

6. The actuator assembly of claim 1 wherein the body portion is configured for rotation about an actuator axis, wherein the body portion comprises opposing first and second ends along said axis, and wherein the damping assembly is positioned so as to be adjacent the first end.

7. The actuator assembly of claim 1 wherein the body portion is rotatable about an actuator axis and wherein the damping assembly adds an asymmetric mass to the actuator assembly with respect to said axis.

8. The actuator assembly of claim 1 wherein the body portion comprises a window opened to an inner void of the body portion opposite the at least one actuator arm, and wherein the damping assembly comprises a rigid body having a width sized to seat in the window.

9. The actuator assembly of claim 8 wherein the damping assembly comprises first and second rigid bodies and a damping layer and the first rigid body is sized to fit in the window and the second rigid body is wider than the window.

10. The actuator assembly of claim 1 further comprising a data transducer supported by the at least one actuator arm.

11. A servo writing apparatus comprising:
a spindle assembly; and
an actuator assembly comprising a body portion, at least one actuator arm extending from the body portion toward said spindle assembly, and a damping assembly supported by the body portion and configured to suppress a torsional vibration mode of the actuator assembly determined prior to attachment of the damping assembly to the body portion.

12. The servo writing apparatus of claim 11 wherein the damping assembly comprises a rigid body or block.

13. The servo writing apparatus of claim 11 wherein the actuator block comprises a window opened to a cavity or void of the body portion and the damping assembly comprises at least one rigid block disposed in the window.

14. The servo writing apparatus of claim 11 wherein the body portion is configured for rotation about an actuator axis, wherein the body portion comprises opposing first and second ends along said axis, and wherein the damping assembly is positioned so as to be closer to the first end as compared to the second end.

15. The servo writing apparatus of claim 11 wherein the actuator assembly further comprises a data transducer supported by the at least one actuator arm.

16. A method comprising the steps of:
providing an actuator assembly comprising a body portion from which at least one actuator arm extends;
determining a torsional vibration mode of the body portion; and
attaching a damping assembly to the body portion to suppress said torsional vibration mode.

17. The method of claim 16 wherein the body portion is configured for rotation about an actuator axis, wherein the body portion comprises opposing first and second ends along said axis, and wherein the damping assembly is positioned so as to be adjacent the first end.

18. The method of claim 16 wherein the body portion is rotatable about an actuator axis and wherein the damping assembly adds an asymmetric mass to the actuator assembly with respect to said axis.

19. The method of claim 16 wherein the determining step comprises a step of measuring vibration at spaced positions along the actuator body and along the at least one actuator arm.

20. An actuator assembly comprising a body portion, at least one actuator arm extending from the body portion, and a damping assembly supported by the body portion, said actuator assembly formed by a process comprising steps of providing said actuator assembly, determining a torsional vibration mode of the body portion, and attaching the damping assembly to the body portion to suppress said torsional vibration mode.

21. The actuator assembly of claim 20 wherein the damping assembly comprises at least one viscoelascic damping layer.

22. The actuator assembly of claim 20 wherein the body portion is configured for rotation about an actuator axis, wherein the body portion comprises opposing first and second ends along said axis, and wherein the damping assembly is positioned so as to be closer to the first end as compared to the second end.

23. The actuator assembly of claim 20 wherein the body portion is rotatable about an actuator axis and wherein the damping assembly adds an asymmetric mass to the actuator assembly with respect to said axis.

24. The actuator assembly of claim 20 further comprising a data transducer supported by the at least one actuator arm.

* * * * *